United States Patent [19]

Dockus et al.

[11] 4,388,159

[45] Jun. 14, 1983

[54] SURFACE PREPARATION OF ALUMINUM ARTICLES

[75] Inventors: Kostas F. Dockus, Cicero; William D. Sproul, Palatine, both of Ill.

[73] Assignee: Borg-Warner Corporation, Chicago, Ill.

[21] Appl. No.: 264,311

[22] Filed: May 18, 1981

[51] Int. Cl.³ .......................... C25D 5/44; B05D 3/12
[52] U.S. Cl. ...................................... 204/33; 51/328; 51/356; 427/292
[58] Field of Search .......................... 427/292; 204/33; 51/328, 356

[56] References Cited

U.S. PATENT DOCUMENTS 1,457,149 5/1923 Cunningham .
2,968,577 1/1961 Helling et al. ........................ 117/49
3,012,904 12/1961 Baer et al. .............................. 117/50
3,449,176 6/1969 Klass et al. ......................... 148/6.15
4,099,989 7/1978 Dorsey, Jr. ..................... 427/292 X

OTHER PUBLICATIONS

Products and Finishing, pp. 78-79, Jul. 1979.

Primary Examiner—Evan K. Lawrence
Attorney, Agent, or Firm—Richard J. Schlott

[57] ABSTRACT

The surfaces of aluminum and aluminum alloy articles, when abraded with a low-density abrasive product in the presence of a lower alcohol such as isopropanol, are readily plated or coated to provide a uniform plating or coating. The process is particularly useful in providing aluminum-silicon brazing alloy with nickel or nickel-lead plating for brazing.

2 Claims, No Drawings

SURFACE PREPARATION OF ALUMINUM ARTICLES

BACKGROUND OF THE INVENTION

This invention relates to a process for treating aluminum surfaces. More particularly, this invention relates to a process for treating aluminum surfaces in preparation for a plating, brazing or welding operation.

It has long been known that in order to attain an adherent coating on the surfaces of aluminum and aluminum alloy articles it is necessary to clean the surface of oxides and other foreign matter. Methods for accomplishing the requisite cleaning have been the subject of numerous patents and publications. For example, in U.S. Pat. No. 1,457,149 there was disclosed a process for cleaning such surfaces by scouring with an abrasive, preferably in the presence of water, prior to a plating operation. More recently, in U.S. Pat. No. 2,968,577, a process was disclosed which included the steps of dry polishing with an abrasive body followed by a chemical pickling of the surfaces to remove oxides and then wet polishing the surface with an abrasive prior to a coating operation. Mechanical abrasion of aluminum surfaces in a non-oxidizing atmosphere has also been employed to achieve adherent coatings in a subsequent vacuum-deposition process, as shown in U.S. Pat. No. 3,012,904. The use of a low-density abrasive article to clean metal surfaces as a step in a coating or plating operation was described in U.S. Pat. No. 3,449,176. With these and other prior art processes it was thought essential to coat or plate aluminum surfaces simultaneously with the cleaning step or immediately thereafter in order to avoid surface oxidation and a concomitant loss in adhesion of the coating or plate. When applied to continuous processes as for example in a process for plating continuous aluminum strip, it thus became necessary to design process machinery that included both cleaning and coating equipment.

SUMMARY OF THE INVENTION

The present invention provides an improved process for pre-treating surfaces of aluminum articles prior to a coating or plating operation. The articles may be then immediately coated or plated, or stored in air under ambient conditions without significant change in coating or plating character. The process is readily adapted to continuous operations to provide continuous strip which may then be coiled and shipped or stored for weeks without deterioration in plating quality or loss of plate adhesion. The process is particularly useful in the production of aluminum alloy brazing sheet plated with nickel or nickel alloy wherein the character of the nickel plated surface is critical to the brazability of the sheet.

DETAILED DESCRIPTION OF THE INVENTION

The process of the instant invention employs a tough, flexible low density abrasive structure to clean the surface and reduce or remove the oxides. The cleaning or abrading is carried out in the presence of a non-aqueous solvent, the solvent serving both to cool the work and to rinse the surface free of abraded material.

The resilient low-density abrasive structure used in the practice of this invention comprises a great number of intertwined flexible tough organic fiberous members bonded together at junctures which are widely spaced along said members. Abrasive granules are randomly distributed throughout the article and bonded to the fiberous members. Products of this type are disclosed and more fully described in U.S. Pat. No. 2,958,593. One commercially available product of this type is manufactured by the 3-M Company under the trade designation "Scotch-Brite" low-density abrasive material.

The low-density abrasive structure is applied to the surface of the aluminum article with a brushing or scouring motion relative to the contacting surfaces while flooding the surfaces with a non-aqueous solvent. The solvents useful for the practice of this invention are the volatile and substantially anhydrous lower $C_1$–$C_4$ alcohols including methanol, ethanol, propanol, butanol and mixtures thereof. Isopropanol is particularly effective and therefore preferred. In the practice of the process of this invention, the abrading and cleaning operation may be carried out while the aluminum article is immersed in the solvent. The aluminum article will then be further rinsed with the solvent to ensure removal of finely divided oxides and abrasive particles left by the abrading operation. Alternatively, the surface of the aluminum article may be flooded with a flowing stream of the solvent to simultaneously cool the surface in contact with the abrasive structure and carry away the fine particulate matter.

In prior art cleaning operations such as those shown in U.S. Pat. No. 3,449,176 and in an article in "Products Finishing", July 1979, pp. 78–79, aluminum surfaces are cleaned with low-density abrasive material, preferably in the presence of water, then immersed in a caustic cleaning bath to remove oxides, water-rinsed and immediately coated or plated.

In the process of this invention, the aluminum surfaces are cleaned with low-density abrasive material while in the presence of a nonaqueous solvent and rinsed with the nonaqueous solvent. The cleaned aluminum article may then be coated or plated or may be stored in air for a later coating or plating operation. The process of this invention eliminates the need for use of a chemical cleaning step, providing bright, high quality platable surfaces which retain plating quality during long-term storage in air.

EXAMPLE 1

Aluminum alloy brazing strip was cleaned by contacting the surface with a rotary brush formed of Scotch Brite strips while flooding the surface with isopropanol. The strip was then rinsed with isopropanol and air-dried at room temperature.

As a control, aluminum alloy brazing strip was cleaned by contacting the surface with a rotary brush formed of Scotch Brite strips while flooding the surface with deionized water. The strip was then rinsed with water and air-dried.

Profiles of the test strip and of the control strip surfaces were made by Auger Electron Spectroscopy. The control strip cleaned in water had a surface oxide layer amounting to 50–60 A° in thickness. The surface of the strip cleaned in IPA had an oxide layer amounting to about 20 A° in thickness. Chemically-cleaned surfaces generally have an oxide layer amounting to about 20 A° in thickness. It will thus be apparent that cleaning the surfaces of the aluminum strip results in a thin surface oxide layer, similar to that produced by chemical cleaning, while cleaning in water results in a substantially heavier oxide coat. While not wishing to be bound by theory, it would appear that the presence of water during the abrading operation tends to increase the thickness of the resulting oxide layer, possibly by promoting oxidation of the highly active abraded aluminum metal surface.

In an aluminum brazing operation, such as that shown in U.S. Pat. No. 3,482,305, the nature of the surfaces to be brazed is critical. The surfaces of the brazing alloy sheet are first cleaned, then plated with nickel or nickel-lead alloy. Upon heating, the nickel reacts with the aluminum and silicon of the brazing alloy to form a eutectic which must have a favorable wetting action in order to form an optimum, continuous fillet and completely bond the parts. When plated on clean metal surfaces having little or no surface oxide, the nickel or nickel-lead alloy plating is uniform and promotes adequate fillet formation. With increasing amounts of surface oxide, the quality of the plating is lowered, becoming spotty and incomplete. Fillet formation is inadequate, the bond between the parts having a stitched appearance and forming a non-hermetic seal. In general, it is necessary that the oxide layer be maintained at less than about 50 A° in order that the stitching problem will be minimal or non-existant. Prior art processes for preparing aluminum brazing sheet for nickel or nickel-lead alloy plating have therefore included a chemical cleaning step immediately preceeding the plating step, and minimized the exposure of the cleaned surface to air or oxidizing conditions prior to plating. It will be apparent that the process of the instant invention provides the desired low level of oxide without resorting to the use of a chemical cleaning step.

EXAMPLES 2–7

In the following examples, aluminum brazing alloy strip was cleaned with Scotch Brite in the presence of solvent, rinsed with solvent and air dried as in Example 1. The alloy strip was then plated by the process of U.S. Pat. No. 3,970,237 with nickel-lead alloy. The plated surfaces were inspected visually for imperfections. Surfaces rated spotty (see Table 1) had numerous tiny dark areas or defects which gave a spotted appearancae to the surface of the sheet. Microscopic examination of the spots revealed the presence of small defects having litle or no nickel plating. Surfaces having virtually no such defects were rated as uniform. To further demonstrate the effect of cleaning processes on the quality of brazing, parts were formed and brazed at 1120°±10° F. for 5 minutes in a nitrogen atmosphere having less than −60° F. dew point.

TABLE 1

| Example No. | Solvent | Ni Deposit Appearance | Braze Quality |
|---|---|---|---|
| 2 | isopropanol | very uniform | excellent |
| 3 | ethanol | uniform | excellent |
| 4 | perchlorethylene | spotty | stitched |
| 5 | Freon 11 | spotty | stitched |
| 6 | water | spotty | stitched |
| 7 | 50 water-50 IPA | slightly spotty | stitched |
| 8 | water, then caustic-cleaned | uniform | excellent |

TABLE 1-continued

| Example No. | Solvent | Ni Deposit Appearance | Braze Quality |
|---|---|---|---|

It will be apparent that the process of the instant invention produces bright aluminum surfaces that plate well, giving a uniform plating which will braze without exhibiting a stitching problem. The behavior of lower alcohols in this process is unique. Neither Freon (Example 5) nor a chlorinated solvent (Example 4) performed well. Further, both water (Example 6) and mixtures of water with alcohol (Example 7) provided little improvement. The benefits arising by use of lower alcohols in the abrading step are thus unique and unexpected, being equalled only by the prior art chemical cleaning process (Example 8).

EXAMPLE 9

Samples of brazing alloy sheet cleaned as in Example 2 (isopropanol) and Example 8 (chemical cleaning) were prepared, air dried and stored for four weeks in air at room temperature. The samples were then plated with nickel-lead alloy and brazed as described for Examples 2–8. The brazing alloy sheet cleaned with isopropanol as in Example 2 brazed well and exhibited no stitching. The brazing alloy sheet chemically cleaned as in Example 8 brazed poorly and exhibited moderate stitching.

It will thus be apparent that the use of lower alcohols in the abrading step retards oxidation and provides bright, platable alloy sheet having the further unexpected property of retaining plating quality on storage.

The improved process of the instant invention will thus be seen to provide substantial advantages over prior art processes, particularly in the elimination of the use of a chemical or caustic etching bath which provides a reduction in equipment costs and removes a potential hazardous effluent problem. Aluminum or aluminum alloy sheet cleaned by this process and plated with nickel or a bond-promoting metallic plating of nickel, nickel-lead alloy, cobalt, cobalt-lead alloy, or a combination thereof is useful in brazing operations. The process may also be used in processes for the production of decoratively plated or coated aluminum articles and the like, as well as in preparing aluminum and aluminum alloy surfaces for welding.

We claim:

1. A process for providing the surface of an aluminum-silicon brazing alloy sheet with a bond-promoting metallic plating comprising the steps of abrading said surface with a low-density abrasive product comprising a plurality of flexible, tough fiberous members intertwined and bonded together and having abrasive granules randomly distributed throughout and bonded thereto, in the presence of a solvent selected from the group consisting of $C_1$–$C_4$ alcohols, then depositing on said surface said metallic plating selected from the group consisting of nickel, nickel-lead alloy, cobalt, cobalt-lead alloy and a combination thereof.

2. The process of claim 1 wherein said solvent is isopropanol.

* * * * *